(12) United States Patent
Peeters

(10) Patent No.: US 7,660,348 B2
(45) Date of Patent: *Feb. 9, 2010

(54) DISCRETE MULTITONE TRANSMISSION AND RECEPTION

(75) Inventor: Miguel Peeters, Brussels (BE)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/898,151

(22) Filed: Sep. 10, 2007

(65) Prior Publication Data

US 2008/0107189 A1 May 8, 2008

Related U.S. Application Data

(63) Continuation of application No. 10/067,780, filed on Feb. 8, 2002, now Pat. No. 7,269,209.

(51) Int. Cl.
*H04B 1/38* (2006.01)

(52) U.S. Cl. ............... 375/222; 375/260; 370/525

(58) Field of Classification Search ............ 375/222, 375/260, 219, 240, 295; 370/525, 526, 203, 370/252, 364; 702/191, 189
See application file for complete search history.

(56) References Cited

U.S. PATENT DOCUMENTS

| | | | |
|---|---|---|---|
| 6,134,274 A | 10/2000 | Sankaranarayanan et al. | |
| 6,205,410 B1 | 3/2001 | Cai | |
| 6,459,678 B1 | 10/2002 | Herzberg | |
| 6,690,736 B1 | 2/2004 | Andre | |
| 6,807,234 B2 * | 10/2004 | Hansen | 375/259 |
| 6,807,734 B2 | 10/2004 | Hansen | |
| 6,823,002 B1 | 11/2004 | Betts | |
| 6,829,307 B1 | 12/2004 | Hoo et al. | |
| 7,269,209 B2 | 9/2007 | Peeters | |
| 2001/0031011 A1 * | 10/2001 | Betts | 375/259 |
| 2001/0031016 A1 | 10/2001 | Seagraves | |
| 2005/0213718 A1 | 9/2005 | Reina | |
| 2005/0281346 A1 | 12/2005 | Redfern | |

FOREIGN PATENT DOCUMENTS

| | | |
|---|---|---|
| EP | 0 993 141 A1 | 4/2000 |
| EP | 0 996 262 A1 | 4/2000 |
| GB | 2 294 853 A | 5/1996 |
| WO | WO 00/54473 A1 | 9/2000 |
| WO | WO 00/79747 A1 | 12/2000 |

OTHER PUBLICATIONS

Lee, Inkyu et al., "Performance Evaluation of a Fast Computation Algorithm for the DMT in High-Speed Subscriber Loop," Selected Areas in Communications, IEEE Journal, vol. 13, Issue 9, Dec. 1995 pp. 1564-1570.

(Continued)

*Primary Examiner*—Temesghen Ghebretinsae
(74) *Attorney, Agent, or Firm*—Sterne Kessler Goldstein & Fox, P.L.L.C.

(57) ABSTRACT

Discrete multitone transmission assigns bits to tones for transmission. The bits are assigned using permutations of bits and tones that cycle through a sequence of permutations in successive frames.

15 Claims, 4 Drawing Sheets

OTHER PUBLICATIONS

Levin, H.E., "A Complete and Optimal Data Allocation Method for Practical Discrete Multitone Systems," Global Telecommunications Conference, 2001, GLOBECOM '01. IEEE, vol. 1, Nov. 25-29, 2001, pp. 369-374.

Sonalkar, R.V. et al., "An Efficient Bit-Loading Algorithm for DMT Applications," Global Telecommunications Conference, 1998, GLOBECOM (*, The ridge to Global Integration, IEEE vol. 5, Nov. 8-12, 1998, pp. 2683-2688.

Reference Manual for Telecommunications Engineering, John Wiley & sons, Inc., Outside Plant—metallic Pair Systems, Roger L. Freeman Article Online Posting Date: Jan. 15, 2002 Sections 7 & 8.

ITU-T Recommendation G.992.1, "Asymmetric Digital Subscriber Line (ADSL) Transceivers," International Telecommunication Union (ITU), Jun. 1999.

"Splitterless Asymmetric Digital Subscriber Line Transceivers2 (Splitterless ADSL2)," International Telecommunications Union (ITU-T Recommendation G.992.4), Jul. 2002, 24 pages.

"Asymmetric Digital Subscriber Line (ADSL) Transceivers," International Telecommunications Union (ITU-T Recommendation G.992.1), Jun. 1999, 256 pages.

"Splitterless Asymmetric Digital Subscriber Line (ADSL) Transceivers," International Telecommunications Union (ITU-T Recommendation G.992.2), Jun. 1999, 179 pages.

"Asymmetric Digital Subscriber Line Transceivers 2 (ADSL2)," International Telecommunications Union (ITU-T Recommendation G.992.3), Jan. 2005, 436 pages.

European Search Report cited in Application No. 03250757.6, dated Sep. 12, 2006.

* cited by examiner

DISCRETE MULTITONE TRANSMISSION AND RECEPTION

CROSS REFERENCE TO RELATED APPLICATIONS

This application is a Continuation of U.S. application Ser. No. 10/067,780, filed Feb. 8, 2002, now U.S. Pat. No. 7,269,209, which is incorporated by reference herein in its entireties.

TECHNICAL FIELD

The invention relates to discrete multitone transmission and reception.

DESCRIPTION OF RELATED ART

Discrete multitone (DMT) transmission is used to transmit data through a link. For example, DMT transmission is used in asymmetric digital subscriber line (ADSL) systems, where its use is specified by the G.992 standard published by the International Telecommunications Union (ITU).

In the transmission system specified by this standard, the input bits are divided between a plurality of discrete "tones", i.e. frequencies. Depending on the exact properties of the link between the transmitter and the receiver, and various constraints, in particular as to output power, some tones are capable of transmitting a larger number of bits than other tones. Accordingly, some of the tones are allocated more bits than other tones. The number of bits transmitted in each tone may be stored in a bit allocation table. The table may be updated from time to time in order to adapt to changing link conditions.

A quadrature amplitude modulation (QAM) constellation point is generated for each tone, the QAM constellation points coding the bits assigned to each tone. For example, the 16 possible QAM constellation points for coding $16=2^4$ bits are illustrated in FIG. 1. A larger or smaller array of points is used depending on the number of bits assigned to any particular tone.

The plurality of constellation points are then converted into an output bitstream, generally by an inverse discrete Fourier transform. The output bitstream corresponding to each frame is known as a symbol which includes within it the individual tones and accordingly the QAM constellation points coding the bits of each frame.

The output bitstream is then transmitted through an ADSL link, for example through the public service telephone network (PSTN), to a receiver which decodes the bitstream constellation points to regenerate the transmitted frames.

In more detail, the decoding may use the steps of firstly carrying out a discrete Fourier transform of the incoming data to obtain complex numbers representing the received QAM symbols. The phases and amplitude of the received QAM symbols will be affected by transmission through the link, but the effects of this can be corrected for by a frequency equaliser, which may include an adaptive filter, to regenerate the transmitted QAM symbols. These are then used to regenerate the transmitted bitstream.

In addition, error correction circuitry is generally included to enable individual bits to be corrected.

However, the transmission links used remain susceptible to noise and narrow band interference. The narrow band interference can cause bursts of errors to enter the receiver. It may be difficult for error correction circuitry to recover from these bit errors, which leads to a loss of data transmission. A particular problem occurs with control frames, which need to be absolutely reliably transmitted.

Accordingly, there remains a need for improved discrete multitone modem transmission.

SUMMARY OF INVENTION

According to a first aspect of the invention there is provided a method of discrete multitone transmission of bits making up a plurality of frames including: allocating a respective number of bits to each of a plurality of discrete tones; assigning the bits of each frame to the discrete tones such that each discrete tone is assigned the allocated respective number of bits, wherein the permutation mapping the bits of each frame to each of the discrete tones cycles through a sequence of different permutations in successive frames; generating for each frame a symbol comprising a plurality of discrete tones moderated to transmit the bits assigned to the respective tones; and transmitting the generated symbols.

In other words, the bits of the frame are scrambled and interleaved in successive frames so that the each bit of the frame is not, as in the present standard G.992, always assigned to the same tone but is assigned to different tones in different frames.

In this way the robustness of data transport to narrow band interference may be improved. Often, different parts of a frame are used to transmit different information and so narrow band interference can effectively destroy transmission on one tone. By scrambling bits of the frame to different tones it is not always the same bits of the frame that are affected. This can greatly ease error correction.

The invention is of particular application to trellis coded bits. Trellis coding is susceptible to narrow band interference, and this susceptibility may be reduced using the invention.

The invention also relates to a discrete multitone modem for transmitting a stream of bits making up a plurality of frames, comprising: a tone generator for assigning the bits in each frame to discrete tones such that each discrete tone is allocated a predetermined respective number of bits, wherein the permutation mapping the bits of each frame to each of the discrete tones cycles through a sequence of different permutations in different frames; a constellation point generator for generating a constellation point for each tone representing the assigned bits; and an inverse discrete Fourier transform module for generating an output signal including a plurality of discrete tones from the constellation points.

The invention also relates to corresponding methods and apparatus for receiving the transmitted signals.

BRIEF DESCRIPTION OF THE DRAWINGS

For a better understanding of the invention, a specific embodiment of the invention will now be described, purely by way of example, with reference to the accompanying drawings, in which.

DETAILED DESCRIPTION

Figure 1:
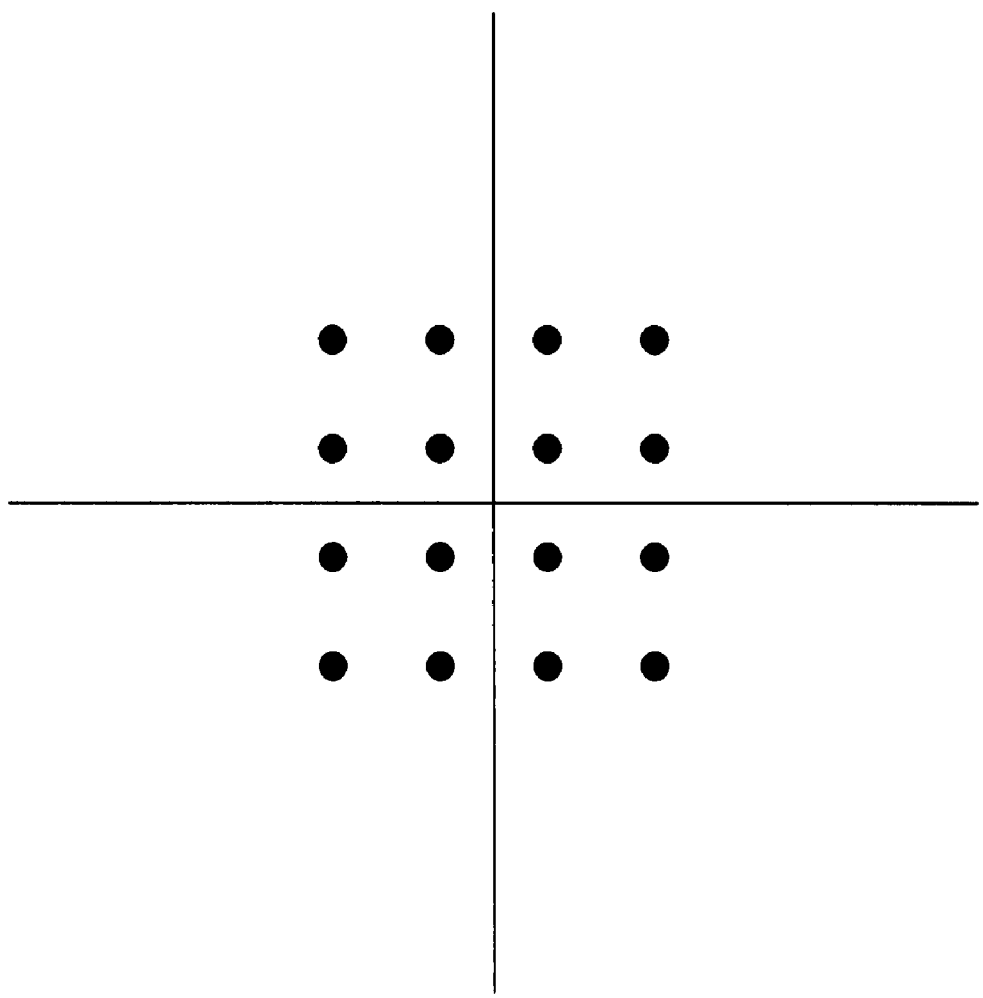
FIG. 1 illustrates 16 QAM constellation points that may be used to encode four bits.
Figure 2:
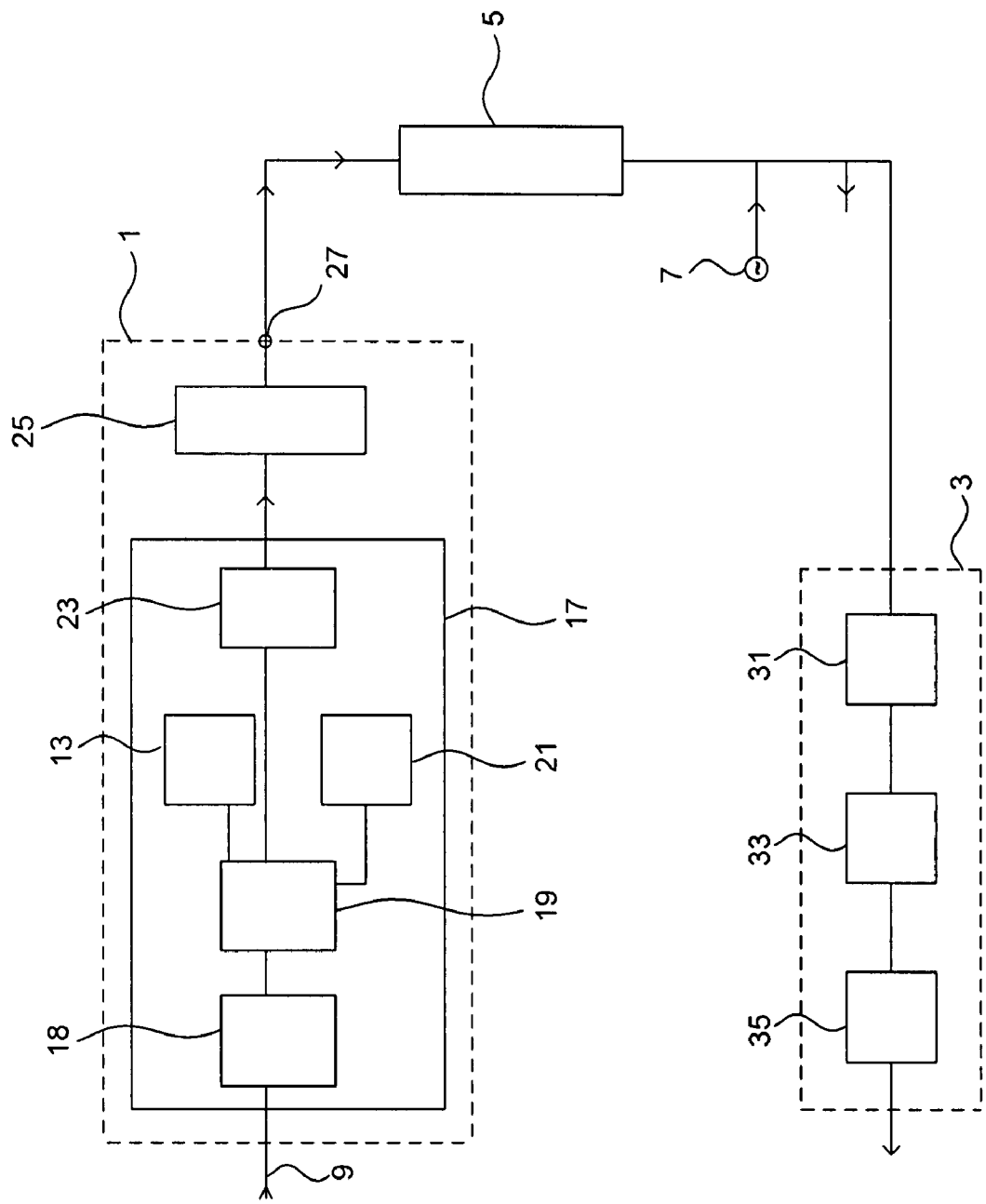
FIG. 2 illustrates a transmitter, a receiver and a link according to an embodiment of the invention.
Figure 3:
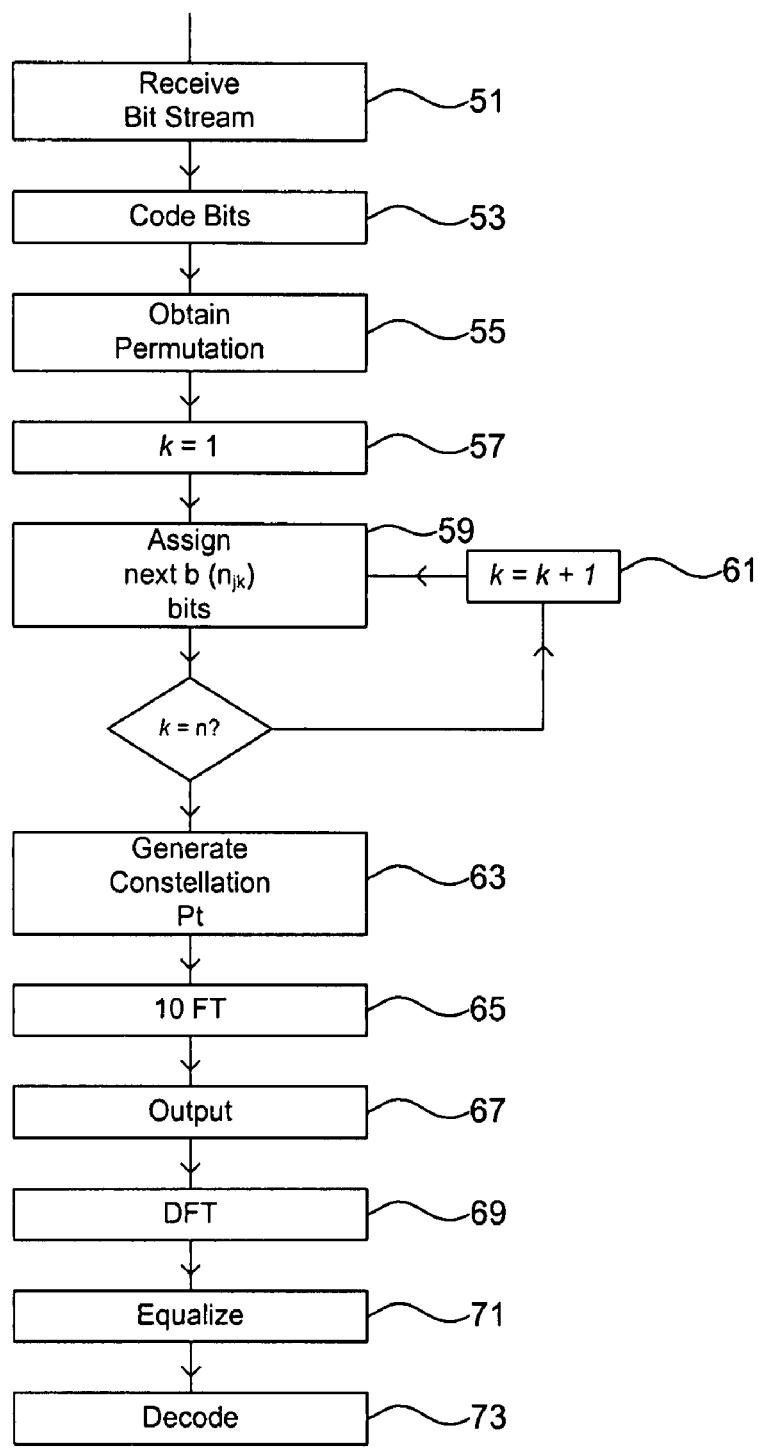
FIG. 3 is a flow diagram of a method in accordance with an embodiment of the inventions.

A data transmission system according to the invention is illustrated schematically in FIG. 2. The method used is illustrated in the flow diagram of FIG. 3.

In general terms, a transmitter 1 transmits data through a link 5 to a receiver 3. The link 5 is not noise-free, and the addition of noise to the signal is illustrated schematically by noise source 7.

The transmitter 1 receives (step 51) a stream of bits 9 for transmission. The stream of bits is divided into a plurality of frames 11, illustrated in FIG. 4. The stream of bits is divided into the frames by a previous stage. In an alternative, the frames may be imposed on a bit stream in the transmitter.

These bits are coded (step 53) using an error correcting code, in module 18. Trellis coding is used in the described embodiment. In trellis coding, the bits of one frame or symbol are selected, not from all possible bit combinations, but from a subset determined with reference to the previous transmitted bits, in such a way that errors in received bits can be identified and corrected. Trellis coding is well known and will not be described further. The skilled person will be aware of many other suitable forms of error-correcting codes, such as Reed-Solomon codes, any of which may be used in combination with the invention.

The data is sent through the link 5 using a plurality of discrete tones, i.e. frequencies. Each of the tones may carry a different number of bits, which are recorded in a bit allocation table 13. The bit allocation table records the number of bits b(i) for the ith tone, where i is a positive integer which can vary from 1 to n, n being the number of discrete tones.

Figure 4:
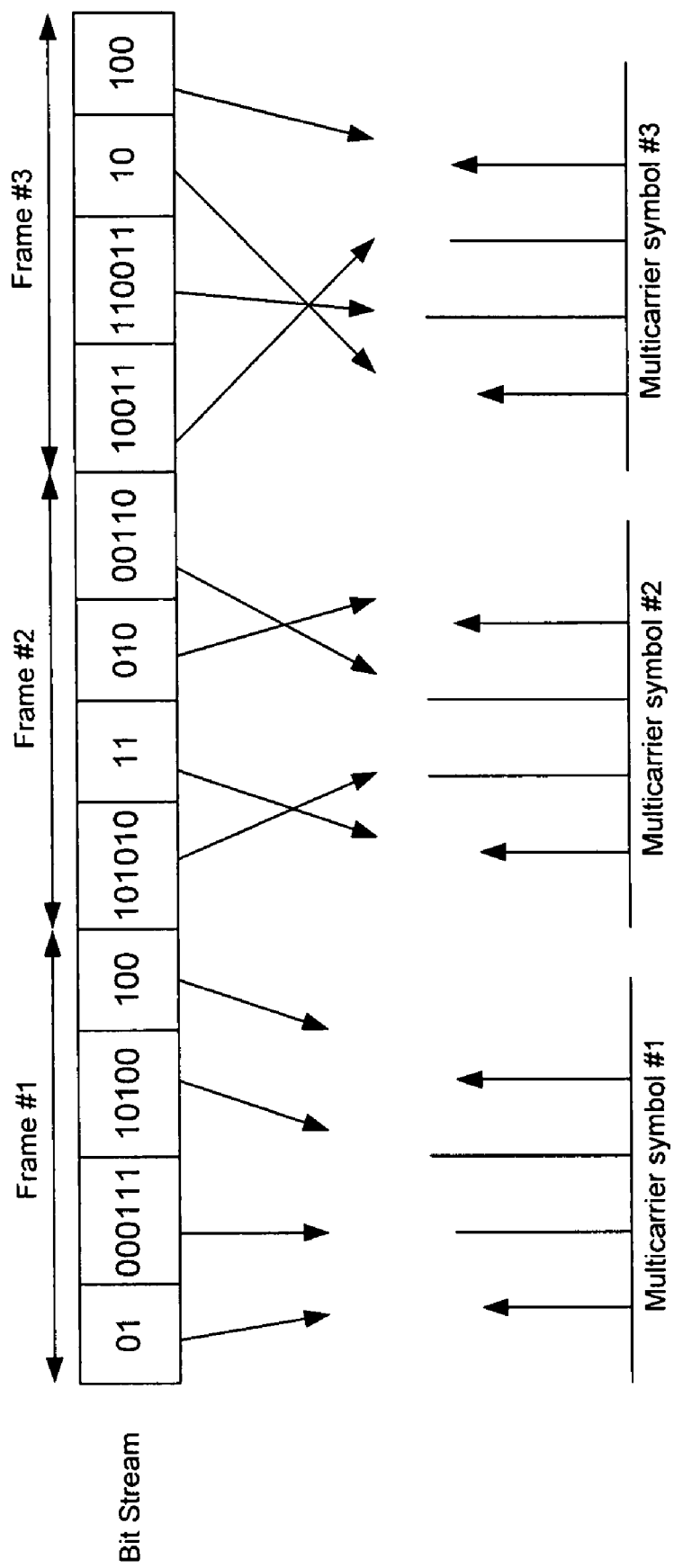
FIG. 4 is a schematic diagram of bit allocation in accordance with an embodiment of the invention.

The bit allocation is shown schematically in FIG. 4, which illustrates a plurality of tones 15, of varying capacity. In the simplified example, the first tone carries 2 bits, the second tone carries 6 bits, the third tone 5 bits and the fourth tone carries 3 bits. In practice, a larger number of tones may be used. For example, the current ADSL standard G.992 published by the International Telecommunications Union (ITU) uses 255 tones.

The number of bits carried by each tone depends on the noise in the channel at the frequency of that channel, and is subject to constraints such as the maximum total power to be transmitted through the channel. The number of bits that the channel is able to carry varies from time to time. Accordingly, the bit allocation table 13 may be updated periodically, for example daily, hourly or indeed at any convenient frequency. Methods of determining the number of bits that may be transmitted on each tone are well known and will not be described further.

The bit allocation table 13 is provided in a tone generator 17 which receives the incoming bit stream. An assignment module 19 in the tone generator 17 assigns the bits to the tones.

The bits are assigned to the tones as follows. Firstly, the permutation used for the frame is obtained (step 55) from scrambler 21 which outputs a different permutation each time it is triggered. The scrambler is triggered once per frame in order that there is a new permutation for each frame. The permutation in the jth frame may be considered to be an ordered set of integers $[n_{j1}, n_{j2}, n_{j3}, \ldots n_{jn}]$. $[n_{j1}, n_{j2}, n_{j3}, \ldots n_{jn}]$ thus represents the permutation of the first n positive integers $[1, 2, 3 \ldots n]$ for the jth frame.

A loop is initialised (step 57) with k=1. Then, the loop is repeated with the next $b(n_{jk})$ bits of the frame being assigned (step 59) to tone k in order, and k is incremented (step 61) until k=n and the final bits of the frame are assigned. In this way, the bits are assigned in order from the start of the frame starting with the first tone $n_{j1}$ of the permutation of the jth frame followed by the second tone $n_{j2}$ and so on until $n_{jn}$ is reached.

In the first frame, the bits are assigned to the tones sequentially in the first predetermined permutation. If the first tone of the first permutation is to be the tenth tone ($n_{11}$=10) the bit allocation table reports that b(10) bits are to be assigned to the tone, and the first b(10) bits of the frame are allocated to that tone. If the next tone to be used is the forty seventh tone ($n_{12}$=47), the next corresponding number of bits b(47) of the frame are allocated to the forty seventh tone. This is repeated until all of the bits of the frame are allocated. This method of allocation can be represented as a permutation of the integers [1, 2, 3 ... n], where the integer in each position represents the tone number of the corresponding bits of each frame. Thus, if the first bits are assigned to tone number 10 and the second bits to tone number 47, the permutation begins [10, 47, ... ].

In the simple example shown in FIG. 4, in the first frame the first 2 bits are assigned to the first tone, the next 6 bits are assigned to the second tone, then the next 5 bits are assigned to the third tone and the final 3 bits are assigned to the fourth and last tone. This can be represented as the permutation $[n_{11}, n_{12}, n_{13}, n_{14}]$=[1, 2, 3, 4].

In the next frame, the permutation between bits and tones is changed. Thus, in the example of FIG. 4, the first bits are assigned to the second tone (i=2). Since the number of bits allocated to the second tone (b(2)) is 6, the first 6 bits are assigned to that tone. The next tone used is the first tone. Since the first tone used only carries 2 bits, the next 2 bits are assigned to the first tone, and so on until all the bits of the second frame are allocated. This can be represented as the permutation $[n_{21}, n_{22}, n_{23}, n_{24}]$=[2, 1, 4, 3].

A different permutation of bits and tones is then used for the third, fourth and subsequent frames. In the third frame, the illustration shows the permutation $[n_{31}, n_{32}, n_{33}, n_{34}]$=[3, 2, 1, 4].

It is preferred to use a cycle of all possible permutations of bits and tones in the successive frames before returning to the start of the cycle and repeating. Thus, in the simple example of FIG. 4 the allocation of bits cycles through each of the twenty four permutations of [1, 2, 3, 4] before repeating the cycle.

The permutations are generated using a scrambler 21 which operates by generating a sequence of permutations in a predetermined manner which can be unscrambled using a like scrambler at the other end. Such scramblers are known per se and will not be described further.

Alternatively, for a simple example the permutations can simply be stored in a look-up table in the tone generator. For larger numbers of tones, it is generally more convenient not to simply store all the permutations in a look up table but to generate them deterministically. For example, the tones may be generated by a psuedo-random number using a known seed.

The bits assigned to respective tones are passed to a constellation generator 23 which generates (step 63) a constellation point representing the bits assigned to each tone. The number of constellation points to be chosen from will depend on the number of bits allocated to each tone. For example, if 6 bits are allocated to a tone then there will need to be $2^6$=64 constellation points. In the example, quadrature amplitude modulation is used, but the skilled person will readily be able to select a suitable method of generating the constellation points from the many known methods, which include amplitude phase keying, and quadrature phase shift keying. The quadrature amplitude modulation that is used is a specific implementation of amplitude phase shift keying in which the data points used are arranged in a square array.

The constellation points are passed to an inverse discrete Fourier transform module 25 which carries out an inverse discrete Fourier transform (step 65) and outputs (step 67) the transformed data on output 27 to the channel 5. Inverse discrete Fourier transforms and modules for carrying out such transforms are well known and will not be described further here.

The data output is passed through the channel 5 to the receiver 3. In the receiver, a discrete Fourier transform module 31 carries out a discrete Fourier transform (step 69) on the data. Discrete Fourier transforms are well known and will not be described further here.

A frequency equaliser 33 compensates for effects in the channel by shifting (step 71) the phase of the received constellation points to compensate for any phase shift or amplitude loss in the channel. Such systems are well known.

A decoder 35 generates (step 73) the received bits from the received constellation points. The received bits must be correctly assigned to the bits in the frame by undoing the mapping of bits to tones carried out in the tone generator 17. Since the sequence of permutation of bits to tones is predetermined, and shared by receiver and transmitter, this can be readily accomplished.

In a modification of the invention, if the sequence of permutations is not predetermined, then an initial message can be passed from transmitter to receiver to set-up the communication and to transmit information regarding the sequence of tones.

The use of variable tone ordering allows a much flatter power spectral density in dynamic power during periods when the link is not fully loaded if as much zero as possible is transmitted during such periods.

The variable tone ordering increases the robustness of the data transport to narrow band interference. It is common for transmitted data to contain certain parts in certain parts of each frame. For example, control data may often occur in predetermined parts of each frame. Furthermore, where a number of different signals are being transmitted it is common to assign each signal a certain part of the frame. Noise is frequently narrow band and therefore in prior arrangements without variable tone ordering such noise will always affect the same part of the frame and so the same part of the signal. This can make it very difficult for error correction techniques to recover from the effects of noise. When using variable tone ordering according to the invention the effects of the noise are effectively spread over the whole of the frame and this can make it much easier to correct for using conventional techniques.

In the preferred embodiment of the invention, trellis coding occurs in the transmitter before the bits are assigned to tones. In this way subsequent bits that are trellis coded using bits output at one frequency are not output at the same frequency or tone. This increases the robustness of the trellis coding to narrow band interference by largely preventing bursts of errors entering the decoder and reducing its correction capability.

The invention is not limited to the arrangements described above but modifications will be readily apparent to the skilled person. For example, although the invention has been described with reference to a transmitter and a receiver both ends of the data link may be capable of both transmitting and receiving.

The invention is not just suitable for ADSL transmission but may also be used in other areas, such as VDSL, digital video transmission, or indeed any transmission of data divided or capable of being divided into frames.

In a modification of the invention, the individual bits are not assigned in groups to the tones but are assigned individually. Thus, the first bit may be assigned to tone 47, the second to tone 68, and so on until each of the bits of the frame are assigned. In this case, the permutations will be of m integers where m is the number of bits in each frame.

For speed, the invention may preferably be implemented in dedicated hardware for carrying out the method described. The hardware may include discrete components; alternatively the components may be integrated onto a single integrated circuit and or hybrid module. The coding and decoding functions may alternatively be implemented on a general purpose computer programmed to carry out the method.

The invention claimed is:

1. A method for discrete multitone transmission of bits in a data stream, the data stream being divided into a plurality of frames, including:
   (a) applying a tone assignment permutation to a frame in the plurality of frames, wherein the tone assignment permutation defines an order for a plurality of discrete tones to be used to assign a set of bits to the frame;
   (b) allocating a respective number of bits to each of the plurality of discrete tones in accordance with the tone assignment permutation;
   (c) assigning the set of bits of the frame to the plurality of discrete tones in accordance with the tone assignment permutation such that each discrete tone is assigned the allocated respective number of bits;
   (d) generating for the frame a symbol comprising a plurality of discrete tones modulated to transmit the bits assigned to the respective tones;
   (e) repeating steps (a) through (d) for subsequent frames in the data stream wherein the tone order in the tone assignment permutation changes for each subsequent frame; and
   (f) transmitting the generated symbols.

2. The method of claim 1, further comprising:
   generating a set of tone assignment permutations.

3. The method of claim 2, wherein the set of tone assignment permutations includes a tone assignment permutation for each possible tone order.

4. The method of claim 2, further comprising:
   storing the generated set of tone assignment permutations in a look-up table.

5. The method of claim 4, further comprising:
   prior to step (a), retrieving a tone assignment permutation from the look-up table.

6. The method of claim 2, wherein a number of tone assignment permutations in the set of tone assignment permutations is based on the number of tones being used for transmission.

7. The method of claim 2, wherein each tone assignment permutation in the set of tone assignment permutations is unique.

8. The method of claim 1, further comprising:
   prior to step (a), generating the tone assignment permutation using a pseudo-random technique.

9. The method of claim 7, wherein step (e) further comprises:
   repeating steps (a) through (d) using each unique tone assignment permutation in the set of tone assignment permutations.

10. The method of claim 1, wherein each frame has the same number of bits and wherein a plurality of bit positions in the frame are assigned to different tones in subsequent frames.

11. A system for discrete multitone transmission of a data stream, the data stream being divided into a plurality of frames, comprising:

a tone generator, wherein the tone generator includes:

an assignment module configured to process the plurality of frames by applying a tone assignment permutation to each frame, wherein the tone assignment permutation defines an order for a plurality of tones to be used to allocate a respective number of bits to each of the plurality of discrete tones, and to assign a set of bits of the frame to the plurality of discrete tones such that each discrete tone is assigned the allocated respective number of bits, wherein the tone order in the tone assignment changes for each subsequent frame;

an inverse Fourier transform module configured to generate for each frame a symbol comprising a plurality of discrete tones modulated to transmit the bits assigned to the respective tones; and a transmitter to transmit the generated symbols.

12. The system of claim 11, wherein the tone generator further comprises:

a scrambler configured to generate a set of tone assignment permutations.

13. The system of claim 12, further comprising:

a memory for storing the set of tone assignment permutations in a table.

14. The system of claim 11, wherein the tone generator further comprises:

a scrambler configured to generate a tone assignment permutation responsive to a request from the assignment module.

15. The system of claim 14, wherein the assignment module is configured to request a tone assignment permutation from the scrambler for each frame being processed.

* * * * *